March 28, 1961 G. E. SUDEROW 2,976,692
MOBILE BREAKWATER
Filed Dec. 21, 1956 2 Sheets-Sheet 1
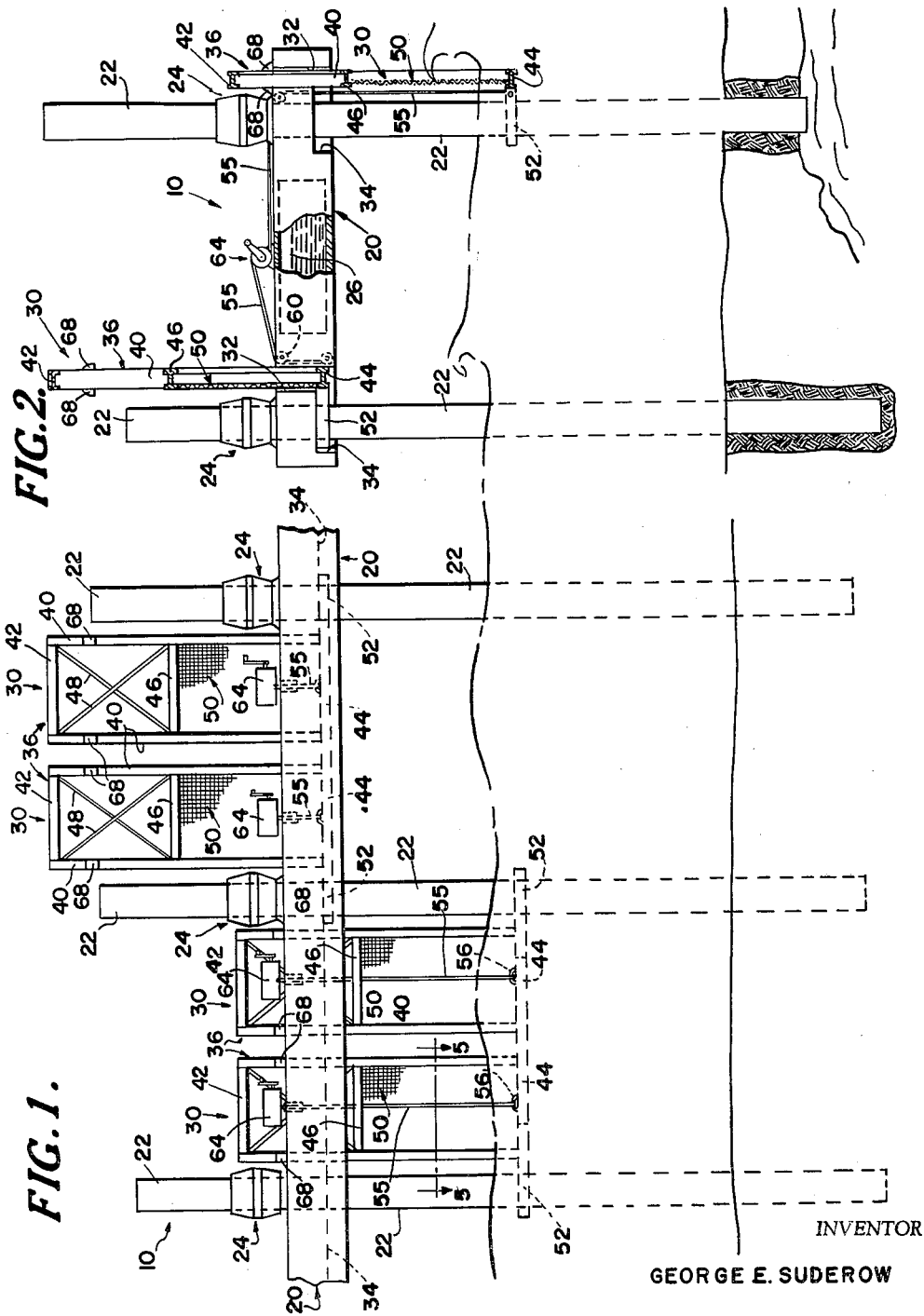
INVENTOR
GEORGE E. SUDEROW
BY Cushman, Darby & Cushman
ATTORNEYS March 28, 1961 G. E. SUDEROW 2,976,692
MOBILE BREAKWATER
Filed Dec. 21, 1956 2 Sheets-Sheet 2
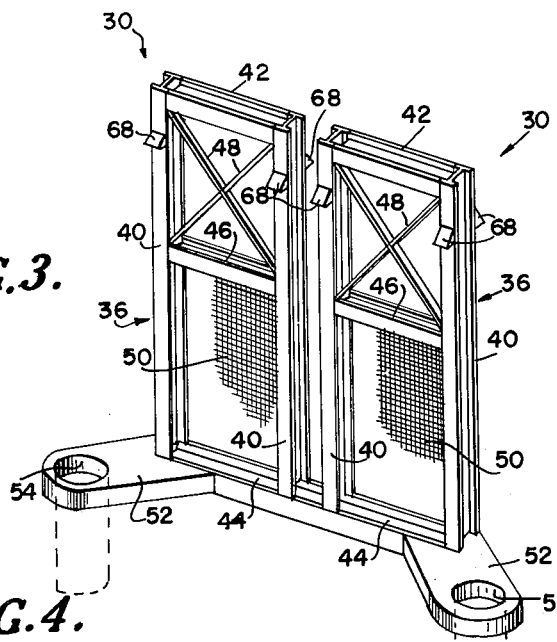
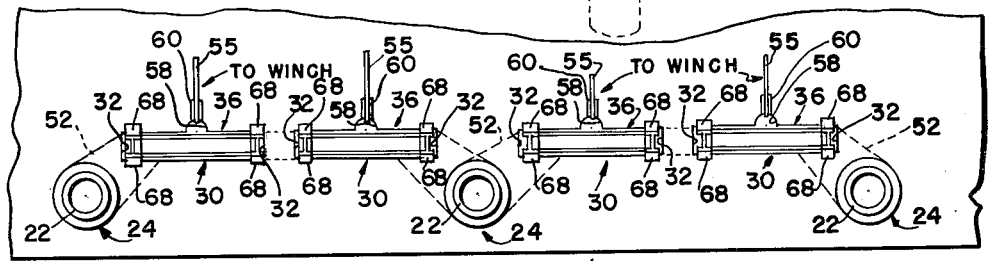
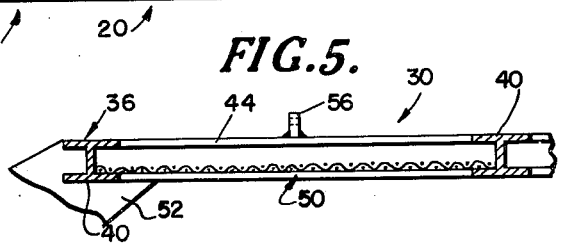
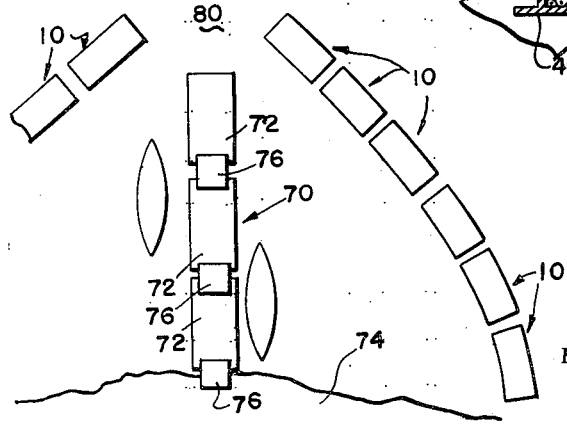
INVENTOR
GEORGE E. SUDEROW
BY Cushman, Darby & Cushman
ATTORNEYS 2,976,692
Patented Mar. 28, 1961

2,976,692
MOBILE BREAKWATER

George E. Suderow, New York, N.Y., assignor to De Long Corporation, New York, N.Y., a corporation of Delaware Filed Dec. 21, 1956, Ser. No. 629,879

11 Claims. (Cl. 61—5)

The present invention relates to breakwaters and particularly to portable or mobile breakwaters especially adapted to provide a sheltered area for portable marine platforms or piers and the like.

The employment of portable or mobile marine platforms or piers to form temporary dock or port installations or the like, is usually restricted to waters that are normally calm. This is due, understandably, to the fact that it is difficult and dangerous to dock ships and transfer cargo and passengers in normally rough waters. In some instances, for military, commercial, or other reasons, the most advantageous locations for the utilization of these platforms or piers, to form ports and the like are in waters that often are rough and turbulent. Under these circumstances, the marine platform structures alone have proved unsatisfactory for both the convenient and safe berthing of ships, and also the safe transfer of cargo and passengers.

Accordingly, it is an important object of the invention to provide a novel mobile breakwater particularly suitable for use in connection with portable marine platforms or piers, facilitating the berthing of ships and safe transfer of cargo and passengers between ship and platform in rough waters.

Another object is to provide a mobile breakwater formed by connecting a breakwater means to a portable marine platform of the general type described in the copending Pointer application, Serial No. 283,567 now Patent No. 2,775,869. As is well understood, these platforms or barges are buoyant so that they may be towed on the water, for convenient transportation to a desired marine site. They are provided with a plurality of vertically movable legs or caissons operated by jacking mechanisms for engagement of the legs with a marine bottom to elevate and support the platform a safe distance above the surface of the water, out of the range of wave action.

A further object is to provide a novel breakwater means for installation in portable marine platforms of the type referred to above, whereby such breakwater means may be arranged in operative position when the platform is elevated to reduce the intensity of waves without causing any undesirable forces to be exerted on the elevated platform.

It is still another object to design a simplified, durable and inexpensive mobile breakwater that may be conveniently transported from one marine site to another.

Further objects and advantages of the invention will be in part obvious and in part pointed out hereinafter.

The novel features of the invention may be best made clear from the following description and accompanying drawings in which:

Figure 1 is a fragmentary side elevational view of a portable marine platform equipped with breakwater means, embodying the invention, the platform being shown in an elevated position;

Figure 2 is an end elevational view of the structure of Figure 1, the breakwater means being in vertical section, and the platform being partially broken away for illustrative purposes;

Figure 3 is an enlarged perspective view of breakwater means embodying the invention, with the baffle surface thereof partially omitted for convenience of illustration;

Figure 4 is a fragmentary plan view of the structure of Figure 1;

Figure 5 is a horizontal sectional fragmentary view of the breakwater means taken along line 5—5 of Figure 1, and on an enlarged scale;

Figure 6 is a schematic plan view showing an exemplary arrangement of a plurality of mobile breakwaters, on a reduced scale, sheltering a desired port or dock area.

Referring now to the drawings in detail, a mobile breakwater 10 embodying the invention includes an elevated marine platform or body 20, supported above the surface of the water by means of vertical legs 22. The platform 20 preferably is of the type described in the aforesaid Pointer application, wherein the legs 22 are mounted for vertical movement in either direction to enable the device to be converted from a mobile, buoyant barge to an elevated platform. Although not shown in detail, it will be understood that a suitable jacking mechanism 24 is operatively associated with each of the piles 22 for selectively effecting or restraining vertical movement thereof. The legs 22 and jacking mechanism 24 may be of the types described in the above-mentioned Pointer application.

The platform 20 is shown to be rectangular but may be of any convenient size and shape utilizing a plurality of the legs 22 and, as is understood, the platform is buoyant. When transporting such platforms, as barges, between marine sites, the legs 22 are elevated a safe distance from the marine bottom and the platform will float on the surface of the water whereby it may be towed to a desired site.

At this time, the legs 22 are driven downwardly by the jacking mechanisms 24, into engagement with the marine bottom underneath the platform and the mechanisms are further operated to elevate the platform on the legs to a height sufficiently above the surface of the water to be safely out of the range of intensive wave action. To contribute to the stability of the platform 20 when disposed in an elevated position, the platform may be provided with a suitable number of interior compartments 26 (see Figure 2) into which water may be introduced by conventional pumping means (not shown) after the platform has been raised. As is evident, the water in the compartments 26 adds ballast to the entire structure for increasing its resistance to movement when waves pound against the legs 22, and for generally stabilizing the structure.

As previously stated, it sometimes becomes highly desirable to construct a temporary or permanent dock or pier in waters that often are rough and turbulent thereby presenting difficulties and hazards to the usual maritime and other operations performed at such places. In this regard, the present invention contemplates the utilization of breakwater means in combination with the portable platform 20 for overcoming such difficulties and hazards. The breakwater means preferably are in the form of panels 30. This particular combination, constituting the mobile breakwater 10, is an important feature of the present invention.

The platform 20 preferably is formed with longitudinally aligned and generally rectangular well-like slots or holes 32 (as best seen in Figures 2 and 4), disposed intermediate adjacent legs 22 on each side of the platform for the reception of the breakwater panels 30. Although two of these slots 32 are illustrated between adjacent legs, it will be readily appreciated that their number and relative size may be varied as desired. The slots 32 extend vertically throughout the height of the platform and preferably are arranged slightly inwardly of the adjacent legs on one side and slightly outwardly of the adjacent legs on the other side of the platform, as best seen in Figure 2. The lower surface of the platform, adjacent the bottom of these slots, is recessed at 34 (see Figure 2) for a purpose which will become apparent as the description proceeds.

Each of the breakwater panels 30 preferably includes a generally rectangular outer frame 36 of greater height than width having vertical 40, upper 42, and lower 44, frame parts. These parts may be of metallic I-beam construction secured together by suitable means such as welding. A transversely extending beam or bar 46 is secured to the vertical frame members 40 intermediate their ends and defining therewith a lower rectangular area for the reception of a baffle structure to be described hereinbelow. Reinforcing or strengthening cross-struts 48 may be suitably connected to the frame parts 40, 46, and upper frame member 42. Each of the frames 36 is disposed loosely for vertical movement in one of the openings 32, as best seen in Figures 2 and 4.

The breakwater panels 30 are each provided with a baffle surface 50 preferably extending over the area comprehended by the intermediate 46 lower 44 and vertical 40, frame parts. This baffle surface 50 preferably includes a plurality of openings or perforations and may take the form of a metallic or equivalent screen (as shown) or a perforated plate (not shown), connected to the adjacent frame parts by any convenient method such as welding. It will be evident that other openwork baffle surfaces will be suitable, such as metal gratings or inclined parallel plates or slats.

As best illustrated in Figures 1 and 3, the two breakwater panels 30 intermediate adjacent legs 22 preferably are connected together at their lower ends for simultaneous and coordinated movement. Such connection may be effected by making the bottom frame parts 44 of the breakwater panels of each pair integral. At the opposite longitudinal ends of the lower frame parts 44 of each connected pair of breakwater panels 30, a guiding means or plate 52 is arranged for engagement with an adjacent leg 22.

This guiding means 52 preferably extends horizontally from an end of the frame part 44 towards the adjacent leg 22 and is provided with a guiding aperture or opening 54 through which the associated leg extends to permit relative vertical sliding movement between the guiding means and leg. Also, the guiding means 52 on each pair of breakwater panels 30 preferably are arranged alternately in overlying and underlying relation with respect to the guiding means on adjacent pairs of panels, should more than two pairs of panels be provided on each side of the platform. That is, as seen in Figure 1, the guiding means 52 on the left-hand pair of panels are, at all times, disposed underneath the guiding means 52 of the right-hand pair of panels and also underneath guiding means on a pair of panels (not shown) disposed to the left thereof. In this way, the guiding means 52 on the raised right-hand pair of panels in Figure 1 will operate as an abutment surface for the guiding means 52 of adjacent pairs of panels to arrest the upward movement thereof; and the upward movement of the right-hand pair of Figure 1 may be limited by engagement of its guiding means 52 with a suitable surface or abutment provided in the associated platform recess 34 into which the guiding means may be retracted.

The recesses 34 in the platform may be made of sufficient size and shape to permit the bottoms of the panels 30 and the guiding means 52 to be retracted or raised to a position flush or inwardly of the lower surface of the platform. By virtue of this feature, the legs 22 may be lifted completely out of the water while remaining in the holes 54 of the guiding means when the platform is floating with the breakwater panels raised, thereby facilitating flotation of the platform 20 in shallow waters.

To effect vertical movement of each pair of breakwater panels 30, any convenient lifting mechanism may be utilized. An exemplary form of lifting mechanism includes a chain or cable 55 fixedly attached to a projection 56 on the inward side of lower frame part 44 of each breakwater panel 30. The cable 55 may extend through a vertical groove 58 on the inward side of each opening 32 (see Figure 4) and is trained around a pulley or sheave 60 journalled in a recess in the upper surface of the platform. The other end of the cable 55 is connected to the rotating drum of a manual or power driven windlass or winch 64 mounted on the platform, as shown. The cables and the windlasses may be arranged for simultaneously or individually and selectively raising or lowering all pairs of breakwater panels 30. Vertical upward movement of the breakwater panels 30 is limited in the manner previously explained and cavities may be provided in the bottom of the platform for the reception of the projections 56 when the breakwater panels are raised, if necessary.

Downward vertical movement of the breakwater panels may be arrested by any convenient means such as detents or stops 68 arranged on the front and back of vertical frame parts 40 at the desired height, for engagement with another surface such as the upper surface of the platform. It will be apparent that the breakwater panels 30 and baffle surfaces 50 are of sufficient height to enable the baffle surface 50, when in operative position, to extend throughout the height of wave action both above and below the normal or mean surface of the water beneath the platform.

The legs 22 on one side of the platform preferably are arranged in transverse alignment with corresponding legs 22 on the opposite side of the platform so that each pair of breakwater panels 30 will be transversely aligned with a corresponding pair of breakwaters on the opposite side of the platform. By reason of this arrangement, waves traveling transversely underneath platform 20, or at an angle thereto, will pass through the baffle surfaces 50 of the lowered breakwater panels 30 on each side of the platform and thereby lose a substantial amount of their energy. Notwithstanding the fact that baffles 50 have openings therein, it has been found that they greatly reduce the energy and intensity of waves pounding thereagainst and particularly is this true when the waves pass through two sets of such baffles in traversing the width of the platform.

Accordingly, an effective reduction in the intensity and energy of waves is accomplished by the breakwater panels 30. Additionally, since these panels have openwork baffle surfaces 50, no severe or undesirable forces are exerted on the platform 20 and legs 22 as a result of the pounding of waves against such baffle surfaces; in other words, some of the energy of waves striking baffles 50 will be transmitted through the openings in such members so that the excessive impact forces which are developed in conventional imperforate breakwater surfaces will not be exerted on the breakwater panels 30 and consequently no serve impact forces will be experienced by the platform. In this regard, the weight of the water in the platform compartments 26 will increase the strength and stability of the platform to resist satisfactorily whatever forces are developed by the impact of waves against piles 22 and breakwaters 30.

It should be evident that the breakwater structure as shown in Figure 3, may readily be installed in existing marine platforms. This may be accomplished by providing the necessary openings 32 in the platform and splitting and reconnecting the various guiding means 52 around adjacent legs. If desired, the breakwater panels may be conveniently arranged at other positions on the platform. Additionally, the breakwaters and lifting mechanisms therefor may be constructed so that they reside, at all times, below the upper surface of the platform so as not to interfere with operations that might be performed on the platform. In this connection, flexible structures rather than the rigid frame 36 for mounting flexible baffles in desired positions will readily suggest themselves to those skilled in the art.

Portable marine platforms equipped with breakwater means, as described, will thus be seen to be usable as mobile or portable breakwaters for numerous purposes. For example, as noted hereinabove, it may be extremely advantageous for millitary purposes or purposes of economy to construct a temporary pier or dock in normally rough waters.

An illustrative arrangement of such a temporary pier is shown schematically in Figure 6, wherein the pier 70 includes a plurality of individual sections 72 normal to and extending outwardly from a shore 74 and interconnected with each other and with the shore by bridge portions 76. The pier 70 may be of the type described in the copending Suderow application, Serial No. 478,627 wherein any appropriate number of sections 72 having vertically movable supporting legs (not shown) may be expeditiously transported to the desired site for erection and assembly thereof. Sections 72 may be thereafter disassembled and lowered to be removed to other sites, as desired. As will be understood, sections 72 may be suitably arranged in permanent assembled relation, if preferred.

Any desired number of mobile breakwaters 10 of the invention may be advantageously arranged and erected outwardly of the pier 70, to abate or reduce the intensity of wave action in the region of the pier. In the illustration of Figure 6, six of the platforms 20 are erected in the usual manner along a curved line on either side of the pier 70, extending substantially to the shore line 74 and defining an inlet area 80 for the pier. After the platforms are erected, the breakwater panels 30 are lowered into operative position and it will be appreciated that the pier 70 is now sheltered from all wave action in the surrounding waters except for waves traveling parallel to the longitudinal axis of the pier, i.e., generally normal to shore 74. If the waves traveling in this latter direction are found to impair operations at the pier, additional breakwaters may be transported to this site and erected outwardly of inlet area 80 and generaly parallel thereto, as shown, without obstructing or impeding navigation to and from the pier. It is believed evident that with such a breakwater arrangement, marine operations may be performed at pier 70 safely and with great facility notwithstanding the turbulence of the waters surrounding the wall of breakwaters 10.

It should be noted that when the mobile breakwaters 10 are in operative position; the breakwater panels 30, on the right side of Figure 2, preferably are disposed outwardly of the sheltered area to be the first part of the breakwater struck by the waves traveling towards said area. In this way, the intensity of the waves will be somewhat abated before they strike the outer legs 22, inasmuch as the baffle surfaces 50 are outward of the legs 22 on this side of the platform. Consequently, the supporting engagement of legs 22 with the marine bottom will not be subjected to the potentially harmful, and dislodging forces which would otherwise be produced by severe wave impacts on the legs. Furthermore, since the platform 20 may be ballasted, as explained, and is elevated on legs 22 a safe distance above wave action, and since the baffle surfaces 50 are of openwork construction, the mobile breakwaters possess, among other things, superior qualities of stability, strength and durability.

The mobility of the breakwaters of the invention will thus be seen to render them highly suitable for use with mobile piers of the type described in the aforementioned Suderow application. Both the pier sections 72 and the breakwaters 10 can be conveniently towed to the desired marine site and erected and maintained in any predetermined relationship for as long a period of time as is necessary. As will be understood, breakwaters 10 may be readily shifted to various positions with respect to the pier depending on the changes, if any, in the direction and intensity of the wave action. After the pier and breakwaters have served their usefulness at one site, they can be disassembled and lowered for removal to other sites. By virtue of their mobility and their effectiveness in abating wave action, the breakwaters 10 will greatly enlarge the number of marine sites at which a temporary pier, dock or the like may be constructed.

It will be readily appreciated that the mobile breakwaters 10 may be efficiently utilized in conjunction with numerous types and arrangements of piers and docks, whether the latter be of a temporary or permanent nature. Moreover, the breakwaters 10 may be used to constitute the pier structure themselves. That is to say, the breakwaters may be arranged at a shore in the manner of sections 72 of Figure 6. In such an application, the breakwaters 10 and the winches 64 therefor preferably would be disposed below the upper surface of platform 20 so as not to interfere with movements and operations on the platform. Marine vessels, obviously, would then be berthed or moored most conveniently and safely on the leeward side of the platform. Many other uses for mobile breakwaters 10 will readily suggest themselves; for example, they may be effectively utilized in connection with dry dock or off-shore drilling, observation or other installations.

It will thus be seen that the objects of this invention have been fully and effectively accomplished. It will be realized, however, that the foregoing specific embodiment has been shown and described only for the purpose of illustrating the principles of the invention and is subject to extensive change without departure from such principles. Therefore, this invention includes all modifications encompassed within the spirit and scope of the appended claims.

I claim:

1. A mobile breakwater arranged off-shore and in a body of water, said breakwater including a buoyant body having a plurality of supporting legs associated therewith; said legs extending downwardly from said body into engagement with a marine bottom and supporting said body above and out of contact with the surface of water; breakwater structure disposed adjacent one of said legs and including baffle means for reducing the energy of waves pounding thereagainst; mounting means for said breakwater structure provided on said body adjacent said one of said legs, said breakwater structure being slidably engaged to said mounting means for vertical movement of said breakwater structure relative to said body; guiding means below said body engaged for sliding vertical movement on said one of said legs and fixedly secured to said breakwater structure; said mounting means and said guiding means restraining horizontal movement of said breakwater structure relative to said body and said legs; and means for disposing and holding said breakwater structure in operative position at the mean water level when said body is elevated.

2. The structure defined in claim 1 wherein the baffle means includes a surface provided with a plurality of openings for reducing the impact of waves pounding thereagainst.

3. The structure defined in claim 2 wherein the body includes a compartment for receiving water to stabilize said body when elevated.

4. A mobile breakwater including a buoyant body having a plurality of supoprting legs associated therewith; means for moving said legs downwardly from the body into engagement with a marine bottom and for elevating and supporting said body on said legs in operative position above the surface of the water; said body having a plurality of slots therein extending throughout the height thereof; breakwater panels arranged adjacent said legs and including baffle means for reducing the energy of waves pounding thereagainst, one of said panels being slidably mounted in each of said slots for vertical movement in either direction; each of said slots including vertical walls engageable to the breakwater panel arranged therein to restrain horizontal movement of the breakwater panels relative to said body; means for moving said breakwater panels downwardly from said elevated body to dispose said baffle means in operative position at the mean water level; and guiding means below said body mounted for vertical sliding movement on said legs and engaged to said breakwater panels, said guiding means providing for vertical movement of said breakwater panels relative to said body and said legs while restraining horizontal movement of said breakwater panels relative to said legs.

5. The structure defined in claim 4 wherein the baffle means includes a vertically disposed surface provided with openings therein for reducing the impact of waves pounding thereagainst.

6. A mobile breakwater including a buoyant body having a plurality of spaced supporting legs associated therewith at opposite sides thereof; means for moving said legs downwardly from the body into engagement with a marine bottom and for elevating said body and supporting it on said legs in operative position above the surface of the water; said body having a plurality of slots therein extending throughout the height thereof and disposed adjacent said legs; generally rectangular breakwater panels arranged adjacent said legs and including baffle means for reducing the energy of waves pounding thereagainst, one of said panels being slidably mounted in each of said slots in an upright position for vertical movement therein in either direction; each of said slots including vertical walls engageable to the breakwater panel arranged therein to restrain horizontal movement of the breakwater panels relative to said body; means attached to said body for selectively lowering said panels relative to said elevated body to dispose said baffle means in operative positon at the mean water level or raising said panels relative to said body to a position adjacent the lower surface thereof when said body is floating; and guiding means below said body mounted for vertical movement on said legs and engaged to said breakwater panels, said guiding means providing for vertical movement of said breakwater panels relative to said body and said legs while restraining horizontal movements of said breakwater panels relative to said legs.

7. The structure defined in claim 6 wherein the body is provided with a compartment at least partially filled with water to stabilize said body when in an elevated position.

8. The structure defined in claim 6 wherein detent means are provided on each of the panels for engagement with the upper surface of the body to limit the downward movement of said panels.

9. The structure defined in claim 6 wherein the means for selectively lowering or raising the panels includes windlass means mounted on said body and operatively connected to said panels.

10. The structure defined in claim 6 wherein the slots on one side of the body are longitudinally aligned and parallel to the slots on the opposite side of the body.

11. The structure defined in claim 10 wherein adjacent pairs of breakwater panels on each side of the body are connected together for simultaneous movement, and each of said pairs of panels being disposed between adjacent legs.

References Cited in the file of this patent

UNITED STATES PATENTS

| | | |
|---|---|---|
| 152,092 | Emerson | June 16, 1874 |
| 461,935 | Dillon | Oct. 27, 1891 |
| 902,372 | Cameron | Oct. 27, 1908 |
| 1,264,756 | Begg | Apr. 30, 1918 |
| 2,710,505 | Magill | June 14, 1955 |

FOREIGN PATENTS

| | | |
|---|---|---|
| 515,208 | Belgium | Nov. 14, 1952 |